United States Patent [19]

Héraud et al.

[11] Patent Number: 4,640,122
[45] Date of Patent: Feb. 3, 1987

[54] APPARATUS FOR LEAK TESTING AT LEAST ONE WALL PORTION AND/OR A VOLUME DELIMITED BY SAID WALL PORTION, AND A METHOD OF DETERMINING OPTIMUM PARAMETERS FOR SAID LEAK TESTING

[75] Inventors: Roger A. Héraud, Orsay; Jacques Amiel, Clamart, both of France

[73] Assignee: Societe de Traitement Automatique—Controle et Etancheite "T R A C E", Fresnes, France

[21] Appl. No.: 774,494

[22] Filed: Sep. 10, 1985

[30] Foreign Application Priority Data

Sep. 10, 1984 [FR] France .............................. 84 13827
Jul. 22, 1985 [FR] France .............................. 85 11153

[51] Int. Cl.⁴ ............................................. G01M 3/32
[52] U.S. Cl. ....................................... 73/49.2; 73/149
[58] Field of Search ................... 73/49.2, 49.7, 40.7, 73/149

[56] References Cited

U.S. PATENT DOCUMENTS

4,078,421  3/1978  Gastaldo et al. .................... 73/49.2
4,272,985  7/1981  Rapson, Jr. et al. ................ 73/49.2

Primary Examiner—Stewart J. Levy
Assistant Examiner—Joseph W. Roskos
Attorney, Agent, or Firm—Sughrue, Mion, Zinn, Macpeak & Seas

[57] ABSTRACT

The method and apparatus are essentially characterized by the fact that the part (2, 201) is filled during a first phase with a gas under pressure from a source (10, 204), e.g. air, said air being cooled inside the part under test by means of an expansion nozzle (22, 79), and by a second phase in which variations in the pressure of the gas inside the part are observed by means of a pressure sensor (80, 214), and a processor unit (221) subsequently performs calculations based on the stabilization time for the pressure inside the part, the length of the measurement periods, the volume of the part, and the observed pressure variations.

16 Claims, 6 Drawing Figures

FIG_1

FIG. 2

FIG_3 fig. 4 fig. 5 fig. 6

APPARATUS FOR LEAK TESTING AT LEAST ONE WALL PORTION AND/OR A VOLUME DELIMITED BY SAID WALL PORTION, AND A METHOD OF DETERMINING OPTIMUM PARAMETERS FOR SAID LEAK TESTING

The present invention relates to apparatus for testing at least a portion of a wall for leaks. Such a wall may be included in a part of the kind including recesses hollowed out therein, such as numerous parts used in making engines, for example, and in particular in the manufacture of motor vehicles. The invention also applies to testing a volume delimited by such a wall portion for leaks.

BACKGROUND OF THE INVENTION

One of the many methods known for leak testing a wall, or more particularly for testing the porosity of any part, is a method which consists essentially in forming a sealed enclosure using said part to be tested and in applying a gas up to a given pressure to said enclosure and then observing variations in the pressure of the gas therein relative to the pressure at which it stabilizes. Obviously the materials used, other than those of the part under test, are specially chosen so as not to be porous, are the gaskets which provide sealing between the various materials making up the enclosure.

In most cases pressure falls off fairly slowly. The rate at which the pressure falls off is representative of the porosity of the wall of the part under test. A part is generally considered good when the rate at which the pressure falls off does not exceed a given threshold, as predetermined by technicians skilled in the art.

The known method outlined above gives good test results and enables good parts to be distinguished from bad parts.

Figure 1:
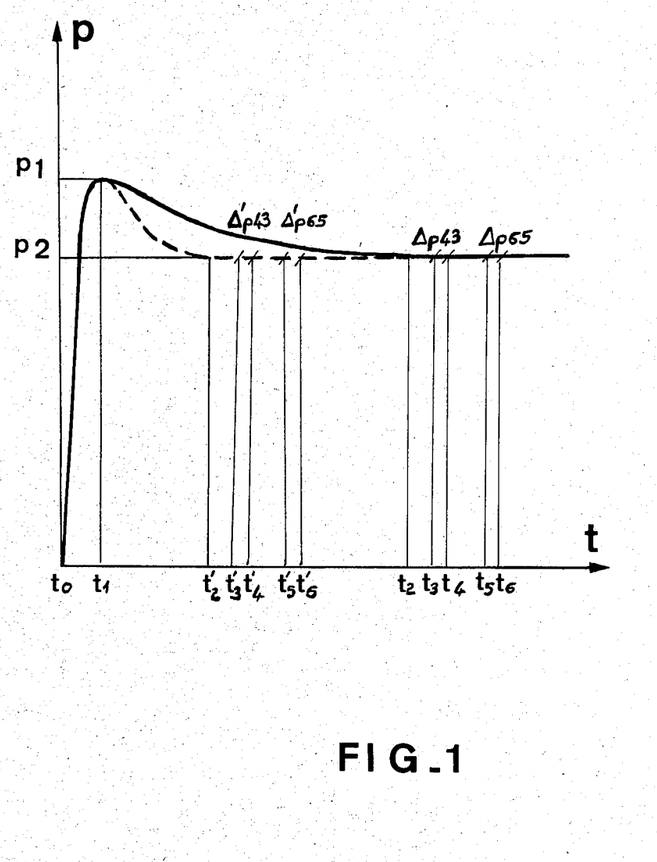
FIG. 1 is a graph used above for explaining the prior art method and also for explaining the operation of apparatus in accordance with the invention, and in particular for showing the advantages thereof.

FIG. 1 is a diagrammatic graph showing variation of gas pressure inside the enclosure as a function of elapsed time plotted in arbitrary units. Thus, it can be seen that between instants $t_0$ and $t_1$ the pressure increases rapidly inside the enclosure due to the enclosure being directly connected to a source of compressed gas. Once the pressure has reached a maximum value, the supply is turned off. Random pressure variations then take place between instants $t_1$ and $t_2$. The duration of such phenomena constitute what technicians call "the stabilization time" during which no meaningful measurements can be taken. In known methods using compressed air, the stabilization time may be as much as 25 seconds. Although this period of time is not very great in itself, when compared with the time taken to fabricate the part in question and with the quantity of parts produced, this time becomes too large and is a factor which limits production. Given that the time required for the pressure rise from $t_0$ to $t_1$, and the time required to perform measurements $\Delta p_{43}$ and $\Delta p_{65}$ between instants $t_3$ to $t_4$ and $t_5$ to $t_6$ (see FIG. 1), all of which periods are relatively short, any reduction, even a small reduction, in the stabilization time would represent a considerable reduction in the cost of manufacturing such parts.

The aim of the Applicant is to reduce said stabilization time.

Thus, a first object of the present invention is to provide a device for leak testing at least a portion of the wall of a part by observing a filling pressure, with the stabilization time being reduced relative to that observed in comparable prior art methods, while still retaining their advantages of low cost, ease of implementation, etc. . .

A second object of the invention is to implement a method for relatively rapidly determining optimum parameters for defining leak test implementation using apparatus in accordance with the invention.

SUMMARY OF THE INVENTION

More particularly, the present invention provides apparatus for leak testing a volume and/or at least a portion of a wall of a part, the apparatus comprising:

means for forming, together with said wall to be tested said volume to be tested, an enclosure having means for and/or said volume to be tested, an enlcousre having means for admitting a reference gas into said enclosure;

means for cooling said gas inside said enclosure;

means for measuring the pressure of said gas inside said enclosure;

the apparatus including the improvement whereby said means for cooling said gas inside said enclosure include at least one nozzle, said nozzle being connected in series with said means for admitting the reference gas.

The present invention also provides a method of determining optimum parameters for defining a method performed with the above apparatus for leak testing a part, consisting firstly in filling said part with a gas under pressure, and secondly in observing the variations in said measuring gas pressure, and including the improvement whereby the observation of variations in the said measuring gas pressure consists in comparing a plurality of pressure difference measurements over predetermined time periods.

BRIEF DESCRIPTION OF THE DRAWINGS

Embodiments of the invention are described by way of example with reference to the accompanying drawings, in which.

MORE DETAILED DESCRIPTION

FIG. 1 has already been described with reference to the prior art.

Figure 2:
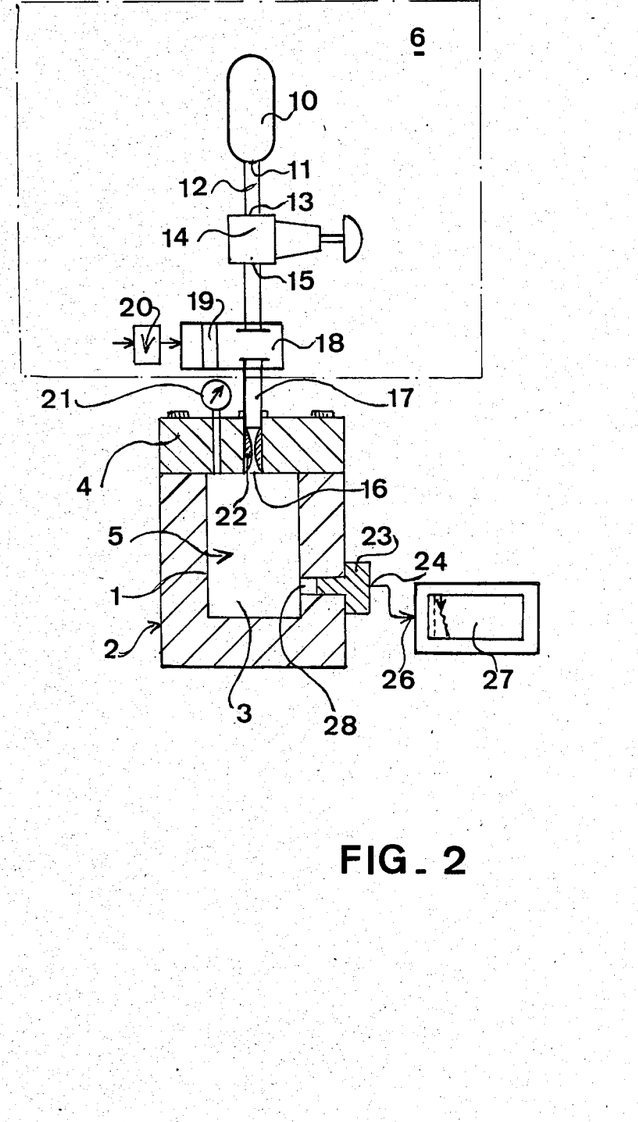
FIG. 2 shows a first embodiment of apparatus in accordance with the invention.

FIG. 2 is a diagram showing a first implementation of apparatus for leak testing a wall 1 of a part 2 containing a hollow recess 3. This part is generally a part of a motor vehicle engine, e.g. a cylinder block and it is necessary to test it for leaks in order to ensure that the engine will work properly.

For the purpose of simplifying the drawings and facilitating comprehension of the invention, the part 2 is shown highly diagrammatically.

The part 2 co-operates with a base 4, and together they constitute a sealed enclosure 5 which is partially enclosed by the wall 1 of the part 2. Naturally the base 4 is chosen for its non-porous qualities, as are the gaskets which enable the base 4 to be coupled to the part under test 2.

The base 4 is associated with means 6 for supplying gas under pressure. These means include a tank of fluid under pressure shown diagrammatically at 10 having an outlet 11 connected via a first duct 12 to the inlet 13 of a pressure-reducing regulator 14 whose outlet 15 is connected to a feed inlet 16 leading to the enclosure 5.

The outlet 15 from the regulator 14 is connected to the inlet 16 via a second length of duct 17 which has a two-position electrically controllable valve 18 inserted in series therein. In one valve position, as shown in FIG. 2, the duct between the outlet 15 and feed inlet 16 is closed, while in a second position, the orifice 19 is aligned with the duct 17 and the valve is open to feed gas to the enclosure 5. Naturally the value 18 is controlled by any means appropriate to the nature thereof. These means are shown diagrammatically at 20 and are not described in greater detail, since electrically or otherwise remote controlled valves are well known per se.

Advantageously, the base 4 includes means for monitoring the pressure inside the enclosure 5, which means are represented by a manometer 21.

An important feature of this embodiment of the invention is a pressure-dropping nozzle 22 in the duct 17 which leads to the enclosure 5 via the orifice 16. The nozzle performs a function which is described below.

A pressure sensor 23 is associated with the part 2, to cooperate with the inside of the enclosure 5. The sensor 23 serves to measure the pressure inside the enclosure 5 as accurately as possible and delivers an electrica signal via an outlet 24 which may be applied to the inlet 26 of the recorder 27. The sensor 23 may be of any appropriate type, but in conventional manner it may be constituted by a strain gauge pressure sensor, i.e. by at least one strain gauge connected in a Wheatstone bridge, and with said strain gauge performing as a function of the pressure applied thereto. The signal obtained across the diagonal of the bridge is then representative of the measured pressure. The sensor 23 is shown disposed in a orifice 28 through the part under test 2, however it could naturally be disposed at any other suitable location for measuring the pressure inside the enclosure 5, which location depends on the shape and the nature of the part under test and on the requirement that it should not be damaged. The sensor could even be disposed on the base 4, or elsewhere in the test circuit if necessary.

The above-described apparatus operates as follows.

When the part 2 is assembled to the base 4 as described above, the regulator 14 is operated so as to obtain a previously determined pressure at its outlet, which pressure is chosen to be much greater than the pressure under which the part is to be tested, e.g. a pressure of four bars for a test at one bar. The valve 18 is then operated to provide a free passage between the outlet 15 and the inlet 16. As soon as this connection is established, gas obtained at a pressure of four bars, for example as described above, enters the enclosure 5 via an expansion nozzle 22 which allows the compressed gas conveyed by the duct 17 to expand inside the enclosure 5 and thus to directly cool the interior thereof. When the pressure inside the enclosure 5 has reached one bar, as mentioned above, the valve 18 is closed.

The Applicant has observed that by performing this gas-cooling operation directly inside the enclosure 5, by virtue of the nozzle 22, the stabilization time as defined above between instants $t_1$ and $t_2$ (see FIG. 1) is considerably reduced. Experiments have shown that prior art equipment giving a stabilization time of 25 seconds has a stabilization time of only 10 seconds when the present invention is applied thereto. In FIG. 1, the dashed curve represents the stabilization time obtained when applying the present invention, while the continuous curve represents the stabilization time obtained by applying the prior art. Time instants applicable to the present invention and corresponding to those marked for the prior art are distinguished therefrom by the use of the prime symbol ('), whereas prior art instants do not include the prime symbol. After instant $t_2$, once the gas pressure has stabilized, the pressure inside the enclosure 5 is measured during periods of time $\Delta p_{43}$ and $\Delta p_{65}$. If the pressure difference reaches or exceeds a threshold determined by the person skilled in the art, the part is considered as being inadequately leak-proof and is rejected for recycling or repair in the conventional way. However, if the measurements reach acceptable thresholds or are below such thresholds, the part is considered as being good and may then be used for further manufacture, e.g. to build an engine as mentioned above.

Naturally, other characteristics may be added to the apparatus without going beyond the scope of the invention. Further, although the above description relates to testing for leaks, it is clear that for a part which does not leak and which is not porous, if its initial volume is known it is possible to monitor any variations in its volume by detecting said pressure variations.

Figure 3:
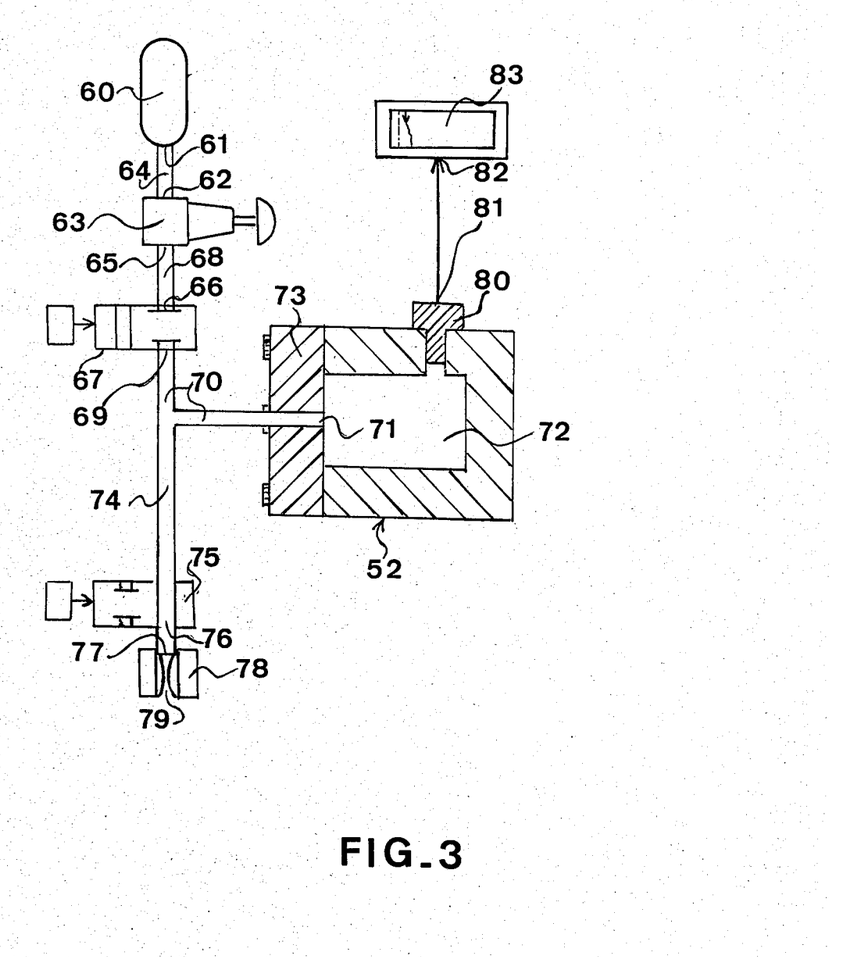
FIG. 3 is a diagram showing a second embodiment of apparatus in accordance with the invention.

Reference is now made to FIG. 3 which is a diagrammatic representation of a second embodiment of apparatus in accordance with the invention, in which the gas is inserted into a part to be tested 52 and is also cooled therein, but using a different expansion operation from that shown in FIG. 2 in which the compressed gas expands on going into the enclosure. In the FIG. 3 example the gas expands on going out from the enclosure. The apparatus comprises, as shown in FIG. 3, a feed tank of compressed gas 60 whose outlet 61 is connected to the inlet 62 of a regulator via a first portion of duct 64. The outlet 65 from the regulator 63 is connected via a second length of duct 68 to the inlet 66 of a valve 67 which is switchable between an open position and a closed position. The outlet 69 from the valve 67 is connected via a third length of duct 70 to a feed inlet 71 into an enclosure 72 formed as before with the part under test 52. The base which completes the enclosure 72 is referenced 73.

A fourth portion duct 74 leads away from said third portion 70 through a second two-position electrically-controlled valve 75 whose outlet 76 is connected to the inlet 77 of an expansion nozzle 78 whose outlet 79 may be directly connected to the ambient atmosphere. It should be understood that the term "expansion nozzle" is used to cover any means suitable for providing a calibrated leakage and capable of giving good results under suitable conditions. Naturally, the duct portion 74 could be directly connected to the enclosure 78 through the base 73, in which case the common third duct portion 70 would be split into two separate ducts.

The FIG. 3 diagram is given for explanatory purposes but it should be understood that it is not to scale. In particular, it is preferable to limit the lengths of the portions of duct, and in particular the third and fourth portions 70 and 74.

This apparatus further includes a pressure sensor 80 identical in principle to the sensor described with reference to FIG. 2 under the reference 23, and serving to measure the pressure inside the enclosure 72 and to deliver an electrical signal at its outlet 81 capable of being applied to the inlet 82 of data processing means 83, e.g. a computer or a recorder having a permanent memory.

The above-described apparatus operates as follows.

Initially the valve 75 closes the outlet from the duct 74 and the valve 67 is opened so that the source of compressed gas can feed the enclosure 72 via the regulator 63 and the orifice 71. If the part 52 is to be tested at a given pressure, e.g. one bar, the regulator 63 is adjusted so that it regulates to a considerably higher pressure than the predetermined pressure, e.g. to four bars. The enclosure 72 is then filled with gas at a higher pressure than the test pressure, e.g. to 1.2 bars for a test which is to be performed at one bar. As soon as this operation has been completed and the pressure has reached the predetermined pressure (1.2 bars in the present example) the valve 67 is closed as illustrated in FIG. 3 and the second valve 75 is opened as likewise shown in FIG. 3. The compressed gas inside the enclosure 72 thus expands through the nozzle 78. Because of the expansion, the gas contained inside the enclosure 72 cools down inside the enclosure 72 at the same time as the gas pressure therein is brought to the appropriate value for the test (i.e. one bar in the present example). When the test pressure is reached the valve 75 is closed.

Then, after the stabilization time has elapsed (which time is relatively short as has been observed by the Applicant) measurements are performed on the pressure variation inside the enclosure in the manner described with reference to FIG. 1 under the references $\Delta p_{43}$ and $\Delta p_{65}$.

In comparison with the apparatus shown in FIG. 2, the FIG. 3 apparatus cools the gas inside the enclosure by allowing the gas to expand out from the enclosure rather than by allowing the gas to expand into the enclosure.

It appears that the FIG. 3 apparatus is capable, under certain conditions, of stabilizing even more rapidly than the apparatus shown in FIG. 2.

Finally, it is mentioned that the present invention is applicable to pressure values which may be relative, e.g. to atmospheric pressure, and that the gas under test may be at a pressure which is higher or lower than the pressure of the reference atmosphere.

As mentioned above, it is advantageous when using apparatus in accordance with the invention to be able to determine optimum parameters for defining the leak test. The method for determining these parameters is explained below with reference to FIGS. 4 to 6.

Figure 4:
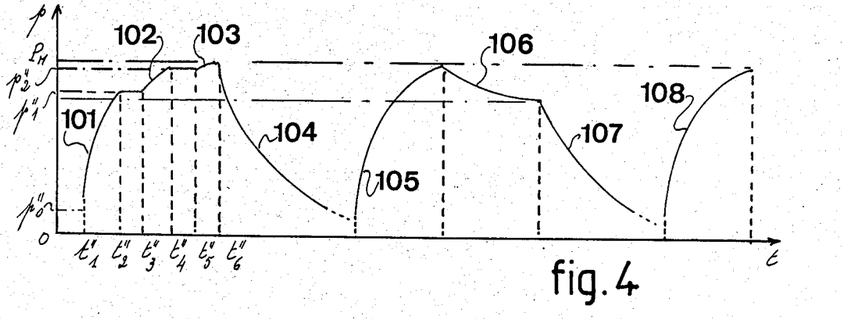
FIGS. 4 and 5 are graphs for explaining the operation of the method of determining optimum parameters in accordance with the invention.
Figure 5:
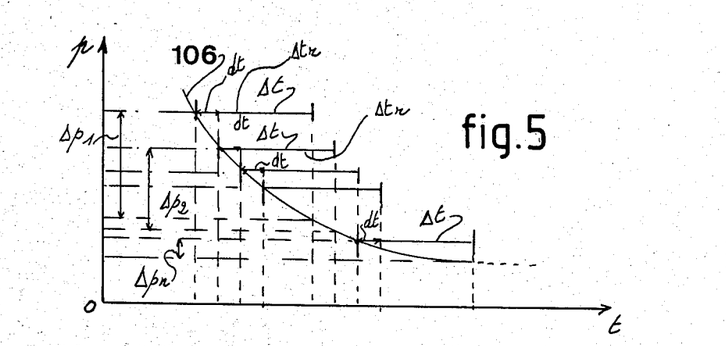
Figure 6:
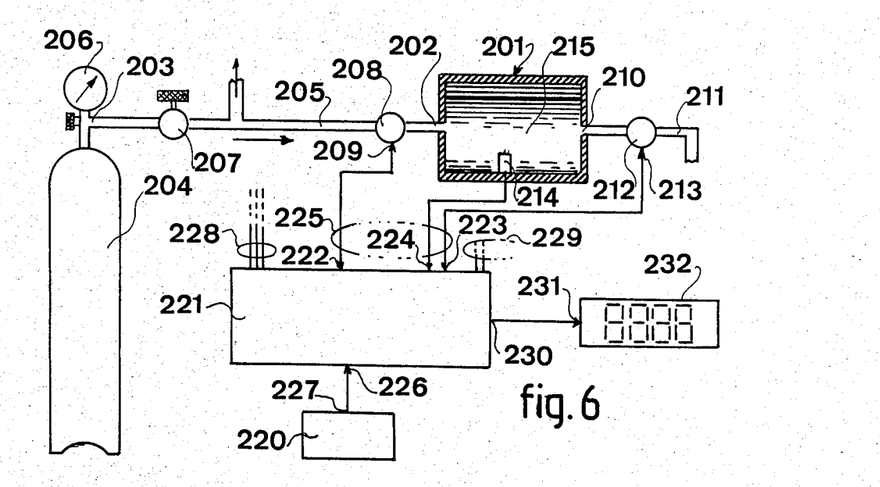
FIG. 6 is a diagram showing an installation for implementing the method of determining optimum parameters in accordance with the invention.

In order to understand the implementation of the method, reference will need to be made, depending on the item in question, to one or other of these three FIGS. 4 to 6.

Thus, FIG. 4 is a graph showing the value of the pressure inside the part which is to be leak tested as a function of time during the implementation of the method in accordance with the invention. The part under test is referenced 201 in FIG. 6.

In order to implement the method, it is initially specified that the method in accordance with the invention for optimized parameter definition makes use of a good part whose leakage characteristics are satisfactory as determined by the usual criteria of the person skilled in the art. This good part is subjected to the method described below.

The method comprises two main phases.

During the first phase the part 201 which is disposed in the air is at least partially filled with a gas, e.g. more air. The part 201 is filled by connecting its inlet 202 to the outlet 203 from a source of high pressure gas 204, e.g. a cylinder of compressed air. This connection is advantageously provided by a duct 205 which includes, in series, an expander 206, a safety stop valve 207, and a valve 208 under electromagnetic or pneumatic control from a control signal applied to a control input 209, e.g. a digital control signal. The part 201 also includes an outlet which may be a third path through the valve 208, but which for simplicity of description and in the drawing has been shown separately from the inlet 202. An exhaust duct 211 is connected to the outlet 210 with a stop valve 212 connected in series therewith and controllable via a control input 203 by means of an order which may likewise be given by means of a digital signal, although this valve may also be of the pneumatically controlled type.

Once the part has been initially partially filled, the pressure inside the part 201 is measured, e.g. by means of a pressure sensor 214 placed therein or at a location which is suitably representative of the pressure inside said part 201. Under these conditions, and given the time required for said partial filling, the value of the pressure obtained at the end of said filling, and the desired test pressure, it is easy to determine with relatively good accuracy the additional quantity of gas which needs to be inserted into the part in order to reach the desired internal pressure. Naturally this quantity is determined in terms of a period of time for which the controllable feed valve 208 is opened, to allow the gas to flow from the source 204 into the part 201.

With reference the curve shown in FIG. 4, a first portion of curve 101 can be seen which corresponds to partial filling between instants $t''_1$ and $t''_2$ during which the valve filling between instants 208 is open. The pressure reached inside the part is then $p''_1$. Since this pressure $p''_1$ is less than the predetermined measuring pressure $P_M$ for the test, an additional fill is required. The additional fill may be performed in a single step after calculating the appropriate open period for the valve 208 between instants $t''_3$ and $t''_4$.

However, it is also possible to perform the additional fill in several successive steps determined in the same manner. In the example illustrated by the FIG. 4 curve, the additional filling up to pressure $P_M$ is performed in two further steps 102 and 103 which correspond to two successive open periods of the valve 208 which are readily determined and/or calculated. These periods extend from instants $t''_3$ to $t''_4$ in order to reach a pressure $p''_2$ and then from $t''_5$ to $t''_6$ in order to reach the pressure $P_M$.

From the above description, it can be seen that during the first part of the method it is easy to determine the most suitable filling time for implementing the method. A filling time $\Sigma t''$ is thus determined which is equal to the sum of the various filling times $\Sigma t''_i$. Under these conditions, when it is necessary to begin testing a series of parts identical to the part used for determining the parameters, and in particular for determining $\Sigma t''$, for it has been determined that the open time for the valve when filling the part should be equal to $\Sigma t'' - \tau$, where $\tau$ is a small predetermined time constant obtained experimentally for compensating filling inertia and in order to ensure that the desired pressure $P_M$ is indeed obtained.

Once the filling time for the part is over, it is necessary to empty the part by opening the valve 212, which operation is represented by a curve portion 104 which returns the pressure inside the part to its original pressure $p''_0$. The same operations may be repeated one or more times in order to be certain of arriving at the correct starting pressure for measurements $P_M$, or in order to check the results obtained by measurements performed during another test. The curve 105 is the result of a filling operation after several filling samples have been performed at the end of which the pressure inside the part is considered as being good.

While the part is being emptied, it is possible to determine a good timing value for controlling emptying of the parts during subsequent testing using the same method and thus optimizing the method in an application where a large quantity of parts are to be tested.

Once the measurement pressure $P_M$ is considered as being good, with the part completely closed, the pressure therein is monitored, e.g. using the pressure center 214. Generally, after the inlet valve 208 and the outlet valve 212 have been completely closed, the pressure stabilizes inside the part and falls off in value. Nevertheless, by observing this variation 106 it is possible to determine whether the part is leakproof or not.

Once this study has been completed and a value has been obtained for the variation 106, the tested part may be emptied as shown by curve 107 in order to be refilled another time at 108, e.g. for verification.

The curve 106 in FIG. 4 shows the fall in pressure as it stabilizes. Experience shows that whatever the part under test, this variation is always a fall in pressure, in other words parts do not exist for which the portion of curve 106 is parallel to the time axis t. However, if there is very little variation that is a sign of an acceptably leakproof part. Depending on the various shapes of parts, on the various fluids used to test them, and on the various materials from which the parts are made, technicians in the art have determined a set of threshold values for pressure variation determining whether a part is considered as being leaky or not.

In order to evaluate the leakage quality of a part in this manner, it is necessary initially to stabilize the pressure and then to perform leak test measurements per se.

The method includes a process which is particularly well adapted to the object specified in the introduction to the present description. This process is described below with reference to curve shown in FIG. 5 which shows the variation reference 106 (FIG. 4) of the pressure inside part as it stabilizes, after it has been raised to a "measuring" pressure $P_M$ (FIG. 4).

In order to observe the value of this variation automatically, pressure differences $\Delta p_1$, $p_2$, ..., $\Delta p_n$ are measured over corresponding constant time periods $\Delta t$.

However, in order to monitor these variations closely, the beginning of each period $\Delta t$ begins after a time lapse dt which is a fraction of the measurement period $\Delta t$, so as to provide a plurality of overlapping measurement periods $\Delta t$.

In practice, the number of overlapping measurement periods $\Delta t$ may be as many as a hundred, with each pressure difference measurement $\Delta p_1$, $\Delta p_2$, ..., $\Delta p_n$ being stored in a memory, thereby following any variations closely and determining, as explained above, the moment at which the pressure may be considered as being stabilized, and the moment from which measurements in pressure variation per unit time may be used for measuring leakage. Since the entire set of measurements are stored in memory, and since they overlap considerably by time fractions $\Delta tr$ equal to $\Delta t - dt$, it is thus easy to observe the instants at which stabilization terminates and thus to determine the time constant needed to arrive at stabilization and begin testing for leakage as timed from the end of filling.

Since the part is a good part, it is very easy with this process to determine the most accurate way of implementing the method, i.e. the length of time after which the pressure may be considered as having reached stabilization, and thus allowing pressure variation to be measured in order to determine whether a part under test leaky.

To begin with, it is specified that the following equation may be used for evaluating the value F of the leak:

$$F = 0.06 \, V \, (\Delta p / \Delta t)$$

where $\Delta t$ is expressed in seconds, V is the volume of the part under test in cubic centimeters, $\Delta p$ is the pressure variation in mbar above which it is considered that there is a leak, and F is the value of the leak in cubic centimeters/minute, with the volume V of the part under test having been determined, for example, by successive approximations.

It is thus possible to calculate the value F of a leak after measuring pressure $\Delta p$ over a measuring time interval $\Delta t$. Depending on the result of the calculation, the part is considered as being leakproof or leaky as the case may be.

From the above equation, it is possible to deduce the following equation which makes it possible to calculate the volume of the part under test. By taking the part and connecting it to a calibrated leak known value F, V may be obtained from the equation:

$$V = (F/0.06) \, (\Delta t / \Delta p)$$

since F and $\Delta t$ are known a priori, and $\Delta p$ is measured.

The measuring period may advantageously be determined as a function of the equation:

$$\Delta t = 0.06 \, V \, (\Delta p / \Delta F)$$

Using the characteristics of the method as described above, the only operations that need performing at particular instants as determined by a clock 220 (see FIG. 6), are to open and close the inlet and outlet valves 202 and 212, to take pressure measurements, to store a plurality of such measurements, and to perform calculations as a function of the measurements, and the elapsed times.

Thus, using a central processor unit 221 having terminals 222, 223 and 224 of a bus outlet 225 connected to respective control inputs for the two valves 208 and 212 and to the output from the pressure center 214, and having a synchronizing input 226 connected to an output 227 from the clock 220, it is possible to perform these operations in a completely automatic manner, and even to control several measurements simultaneously using a plurality of bus outlets 228, 229, ... connected to respective other installations similar to that described and including means 201, 205, 208, 211, 212 and 214 as described above.

Naturally, the processor unit may have a result output 230 connected to the input 231 of a display unit 232 so that depending on preprogrammed instructions in the central unit 221 the display unit displays various sensed data items, for example the different time durations or constants once they have been set to their optimum value, or the partial pressures, or the various values of pressure variation.

Naturally, the same device can then be used as a function of the measurements it has performed and stored for testing a set of parts which are identical or similar to the part used for determining the optimum parameters for performing the method. In this case, the display unit 232 then serves to display the results of the tests on these other parts, e.g. by displaying the words "PASS" or "FAIL".

We claim:

1. In an apparatus for leak testing at least a portion of the wall of a part, and/or for leak testing a volume, the apparatus comprising:
   means cooperating with said wall or volume to be tested to constitute an enclosure and including means for conveying a reference gas into said enclosure;
   means for cooling said gas inside said enclosure; and
   means for measuring the pressure of said gas inside said enclosure;
   the improvement whereby said means for cooling said gas inside said enclosure comprises at least one nozzle and said nozzle is connected in series with said means for conveying the reference gas to the enclosure.

2. Apparatus according to claim 1, wherein said means for conveying the reference gas comprise at least one source of said gas at high pressure, a duct connecting said source to said enclosure, and first controllable closure means in series connected in series in said duct.

3. Apparatus according to claim 2, wherein said nozzle is constituted by a gas expander nozzle disposed in series with said duct, at the end thereof which opens out into said enclosure.

4. Apparatus according to claim 2, wherein said duct includes at least one branch connecting said enclosure to the outside thereof and further includes second controllable closure means connected in series on said branch, said nozzle being disposed in series with said branch at the end thereof which opens to the outside from said enclosure.

5. Apparatus according to claim 2, wherein said source of reference gas comprises a tank of gas compressed to a high pressure, and a gas-expanding pressure regulator connected to the outlet from said tank.

6. Apparatus according to claim 1, wherein said gas is compressed air.

7. In a method of determining optimum parameters when leak testing a part partially or wholly constituting an enclosure, said method comprising the steps of filling said enclosure with a gas under pressure, cooling the gas inside the enclosure and measuring the pressure of the gas inside the enclosure, and the improvement wherein said step of cooling the gas inside the enclosure comprises causing said gas inside the enclosure to pass through at least one nozzle for effecting cooling of said gas inside said enclosure and wherein, said method further comprises determining the parameters consisting of a first phase in which the enclosure part is filled with gas under pressure and a second phase in which the variations of pressure in said measuring gas are observed, and wherein said method further includes the improvement whereby said second phase of observing variations in the pressure of said measuring gas consists of comparing a plurality of pressure difference measurements taken over predetermined periods of time.

8. A method according to claim 7, wherein said predetermined periods of time are all of equal duration.

9. A method according to claim 8, wherein the time intervals between the start of each said periods of time are equal.

10. A method according to claim 9, wherein the said time intervals between the said starts of said periods are equal to a fraction of the duration of said periods.

11. A method according to claim 7, wherein said first phase consists in:
    partially filling said part with a determined gas;
    measuring the pressure of the gas in said partially filled part;
    determining, as a function of the said measurement of said pressure of partial filling, the quantity of additional gas which is necessary to obtain a given measuring pressure in said part;
    completing the filling of said part with the determined additional quantity of gas;
    verifying that the said measuring pressure is indeed obtained, and if not restarting said first phase until said measuring pressure is obtained; and
    wherein said second phase consists in observing variations in the pressure of said measuring gas.

12. A method according to claim 7, consisting in measuring at least one pressure difference value inside said part as given by a leak of known value during a predetermined measuring time period, and in determining the volume of said part as a function said measured pressure difference, said leakage value, and the said measuring period.

13. A method according to claim 12, wherein:
    the time required for completely filling the said part is determined as a function of the time required for partially filling said part;
    the time during said second phase required for ensuring that the pressure has stabilized is taken to have elapsed when the pressure is less than or equal to a predetermined value; and
    the measuring time Δt for determining the leakage from the part is given by the equation:

$$\Delta t = K\, V\, (\Delta p / F)$$

where I is a constant, V is the volume of the part under test, Δp is the pressure variation observed for the known leakage value F.

14. A method according to claim 13, wherein the time required to completely fill said part is equal to the sum of the times required for successive partial filling steps minus a predetermined value.

15. A method according to claim 13, wherein said predetermined pressure value for determining the stabilization time is substantially equal to or less than a predetermined value.

16. In a method of determining optimum parameters when leak testing a part such as a wall or volume to be tested using an enclosure constituting or partially formed by said wall or volume, said method including cooling of the gas inside an enclosure, and measuring the pressure of the gas inside said enclosure, the improvement whereby cooling of said gas inside said enclosure comprises causing said gas to flow through at least one nozzle connected in series with means conveying the referenced gas to the enclosure and wherein said method involves further comprises in a first phase, filling said part with a gas under pressure, and a second phase, measuring variations in the pressure of the measuring gas, the improvement wherein said first phase consists of:

partially filling said part with gas, said part having a known volume;

measuring the pressure of the gas inside said part after said partial filling;

determining, as a function said measured pressure of partial filling, the additional quantity of gas which is necessary to obtain a given pressure of measuring gas inside said part;

completing the filling of said part with the predetermined additional quantity of gas;

checking that said given pressure of measuring gas is indeed obtained, and if not, restarting said first phase until said measuring pressure is obtained; and wherein said second phase consists in observing variations in the pressure of said measuring gas.

* * * * *